United States Patent [19]

Kubota et al.

[11] Patent Number: 5,147,435
[45] Date of Patent: Sep. 15, 1992

[54] METHOD FOR SUPPRESSING CRYSTALLIZATION OF FLUORIDE GLASS ARTICLES BY TREATMENT WITH INORGANIC FLUORIDE

[75] Inventors: Yoshinori Kubota; Akira Sakanoue; Yasushi Kita, all of Ube, Japan

[73] Assignee: Central Glass Company, Limited, Ube, Japan

[21] Appl. No.: 698,896

[22] Filed: May 13, 1991

[30] Foreign Application Priority Data

May 23, 1990 [JP] Japan ................................. 2-133643

[51] Int. Cl.⁵ .............................................. C03C 17/22
[52] U.S. Cl. ........................................ 65/30.1; 65/33; 65/DIG. 16
[58] Field of Search .......... 65/3.11, 30.1, 33, DIG. 16

[56] References Cited

U.S. PATENT DOCUMENTS

| | | | |
|---|---|---|---|
| 4,341,873 | 7/1982 | Robinson et al. | 65/30.1 X |
| 4,597,786 | 7/1986 | Nakai et al. | 65/DIG. 16 |
| 4,842,631 | 6/1989 | Hutta | 65/DIG. 16 |
| 4,895,813 | 1/1990 | Bautista et al. | 65/3.11 X |

FOREIGN PATENT DOCUMENTS 57-123843  8/1982  Japan ............................. 65/DIG. 16

OTHER PUBLICATIONS

Electronics Letters, vol. 22, No. 18 (1986), 949–950.

*Primary Examiner*—Robert L. Lindsay
*Attorney, Agent, or Firm*—Fleit, Jacobson, Cohn, Price, Holman & Stern

[57] ABSTRACT

Crystallization of a fluoride glass article is suppressed by treating the surface(s) of the fluoride glass article with a solution of a fluorine-containing alkali metal compound or a fluorine-containing ammonium compound such as, e.g., $LiPF_6$, $NaBF_4$ or $NH_4BF_4$, in a nonaqueous solvent such as, e.g., ethanol, N,N-dimethylformamide or acetonitrile. The treatment can be made at room temperature.

11 Claims, No Drawings

METHOD FOR SUPPRESSING CRYSTALLIZATION OF FLUORIDE GLASS ARTICLES BY TREATMENT WITH INORGANIC FLUORIDE

BACKGROUND OF THE INVENTION

This invention relates to a method for suppressing crystallization of a fluoride glass article by treating the surface(s) of the glass article with a liquid agent.

Fluoride glasses are excellent in light transmittance over a wide range of wavelength extending from the ultraviolet region to the infrared region and hence have been attracting interest as optical materials for use in optical windows, optical fibers, laser oscillators, etc.

Most of hitherto developed fluride glasses employ $ZrF_4$ or $AlF_3$ as the principal component and contain at least one other metal fluoride such as, for example, $BaF_2$, $CaF_2$, $MgF_2$, $PbF_2$ and/or $NaF$. Usually a fluoride glass article is produced by melting a mixture of metal fluorides and casting the melt in a mold. A solid fluoride glass body is obtained by rapid cooling of the melt in the mold. Then the surfaces of the fluoride glass body are smoothed and cleaned usually by a water polishing method.

In general fluoride glasses are relatively small in the difference between the glass transition temperature ($T_g$) and the crystallization temperature ($T_x$), $T_x - T_g$, and considerably low in thermal stability compared with oxide glasses. For example, when a fluoride glass is softened by heating for the purpose of fiberization, the heated fluoride glass is liable to crystallize from the surface by the influence of moisture and/or contaminants adhering to the glass surface. If crystallization occurs the mechanical strength of the fluoride glass fiber greatly reduces, so that the fiberization process can hardly provide a fiber product of stable quality. Besides, in the case of an optical fiber of a fluoride glass crystallization causes an increase in the scattering loss and consequently an increase in the transmission loss.

There are proposals of surface treatments for suppressing crystallization of fluoride glass articles. A typical example is a sort of etching treatment using a $ZrOCl_2$—$HCl$—$H_2O$ system as etching liquid. However, the application of an aqueous liquid agent to fluoride glasses raises problems. Compared with oxide glasses, fluoride glasses are very liable to dissolve in water. When a fluoride glass surface makes contact with water the glass surface becomes susceptible to cracking by corrosion. If a fluoride glass is heated while moisture is adhering to the glass surface it is likely that the moisture reacts with the fluoride glass to form some oxides which become a cause of crystallization.

Also there are proposals of treating fluoride glass surfaces with a gas, but this method is low in efficiency because of using a gas-solid reaction and has not exhibited a practically satisfactory effect.

SUMMARY OF THE INVENTION

It is an object of the present invention to provide a surface treatment method for easily and potently suppressing crystallization of a fluoride glass article.

According to the invention there is provided a method for suppressing crystallization of a fluoride glass article, the method comprising treating at least one surface of the fluoride glass article with a solution of an inorganic fluorine compound selected from alkali metal compounds and ammonium compounds in a nonaqueous solvent.

As to the above stated solution, preferred examples of the fluorine compound are $LiPF_6$, $NaPF_6$, $LiBF_4$, $NaBF_4$, $NH_4F$ and $NH_4BF_4$, and preferred examples of the nonaqueous solvent are ethyl alcohol and N,N-dimethylformamide.

The surface treatment method according to the invention is applicable to any of fluoride glasses developed until now and very suitable for application to fluoride glasses using $ZrF_4$ and/or $AlF_3$ as the principal component(s). There is no particular restriction on the form of the fluoride glass article to be treated by this method. That is, either a preform of a fluoride glass produced by casting or a finished fluoride glass article such as a lens or a prism can be treated by this method. This method is advantageously applicable to any fluoride glass article which is to be subjected to a heat treatment. Usually the treatment according to the invention is made on a smooth surface or smooth surfaces of a fluoride glass article. That is, usually the fluoride glass article is subjected to polishing or chemical etching in advance of the treatment according to the invention, and the polishing or chemical etching may be followed by cleaning with water or an aqueous liquid. It is permissible that moisture or hydroxyl group or even a certain oxide remains on the surface of a fluoride glass article to be treated by the method according to the invention.

The surface treatment according to the invention is very simple and can easily be put into industrial practice with little problem, and this method is very effective for suppression of crystallization of fluoride glass articles. When the surface treatment is made by using a suitably selected combination of a fluorine compound and a nonaqueous solvent, the susceptibility of the fluoride glass article to crystallization reduces to such an extent that when the article is subsequently heated the degree of crystallization is only about ½ to 1/100, or below, of that in the case of heating an untreated fluoride glass article.

In connection with the present invention we have found that when ethanol or N,N-dimethylformamide is used as a nonaqueous solvent there is a possibility of greatly reducing the amount of addition of a fluorine compound to the solvent or even omitting the addition of the fluorine compound. That is, the treatment of a fluoride glass article with nonaqeuous ethanol or N,N,-dimethylformamide alone is also effective for suppression of crystallization of the fluoride glass article, but the suppressing effect is generally smaller than that of the treatment with a solution of a suitable fluorine compound in the same solvent.

When this invention is used in the manufacture of optical fibers of a fluoride glass, it becomes easy to stably accomplish fiberization of the glass without suffering from significant crystallization which causes a decrease in mechanical strength or an increase in the transmission loss of the glass fiber.

DESCRIPTION OF THE PREFERRED EMBODIMENTS

In the present invention useful fluorine-containing alkali metal compounds are $LiPF_6$, $NaPF_6$, $LiBF_4$, $NaBF_4$, $KPF_6$, $KBF_4$, $K_2SiF_6$ $K_2TiF_6$, and useful fluorine-containing ammonium compounds are $NH_4F$, $NH_4F \cdot HF$ and $NH_4BF_4$.

In this invention a nonaqeuous solvent can be selected from alcohols such as methanol, ethanol, 1-propanol, 2-chloroethanol, 2-aminoethanol and ethylene glycol, amides such a formamide, N-methylformamide, N,N-dimethylformamide and N-methylpropionamide, ethers such as dimethyl ether and diethyl ether, nitriles such as acetonitrile and acrylonitrile, carbonates such as ethylene carbonate and propylene carbonate and some other solvents such as dimethoxyethane, ethyl acetate and dimethyl sulfoxide. It is preferred to use ethanol, N,N-dimethylforamide or acetonitrile.

In preparing a solution for the surface treatment according to the invention it is necessary to carefully choose a combination of a fluorine-containing compound and a nonaqueous solvent, because arbitrary combinations of the above named fluorine compounds and solvents are not always effective for the suppression of crystallization of the treated fluoride glass articles.

The above named fluorine-containing compounds are all soluble in ethanol, N,N-dimethylformamide and acetonitrile. A solution of any of these fluorine-containing compounds in ethanol can be used as the treatment liquid in the method according to the invention. However, when N,N-dimethylformamide is used as the solvent it is unsuitable to use $KPF_6$ $KBF_4$ as the solute. When acetonitrile is used as the solvent the solute should be selected from $LiPF_6$, $NaPF_6$, $LiBF_4$, $NaBF_4$, $NH_4F.HF$ and $NH_4BF_4$. In the case of using a nonaqueous solvent alone as the treatment liquid it is unsuitable to use acetonitrile.

In preparing a solution for use as the treatment liquid it is not necessary to dissolve more than 1 mol of a selected fluorine compound in 1 kg of a selected nonaqueous solvent. In most cases the solubility of the fluorine compound in the nonaqueous solvent does not reach 1 mol/kg at room temperature. In such cases it is suitable to use a saturated solution. Among the above named fluorine compounds $LiPF_6$ is relatively high in solubilities in ethanol, N,N-dimethylformamide and acetonitrile, and more than 1 mol of $LiPF_6$ can be dissolved in 1 kg of any of these solvents.

The surface treatment according to the invention can be made at an arbitrary temperature, and it suffices to make the treatment at room temperature for the accomplishment of the purpose of the treatment.

The manner of the surface treatment is not limited, but usually it is suitable and convenient to immerse the fluoride glass article in the treatment liquid for a suitable period of time which is variable according to the composition of the treatment liquid. In general, it is necessary to continue the treatment for at least about 3 hr. In many cases the crystallization suppressing effect of the treatment augments as the treatment time is made longer, but in some cases the effect reduces if the treatment time is indeliberately extended. After the treatment it is preferable to well wash the treated fluoride glass article with the non-aqueous solvent used in the treatment liquid or another nonaqueous solvent which is compatible with the solvent used in the treatment liquid and, preferaly, relatively high in volatility.

EXPERIMENT

This experiment was made on a fluoride glass composed of 51 mol % $ZrF_4$, 20 mol % $BaF_2$, 20 mol % NaF, 4.5 mol % $AlF_3$ and 4.5 mol % $LaF_3$. Test-pieces of the fluoride glass were 6 mm square plates having a thickness of 3 mm, and every test-piece was mirror finished by physical polishing.

The following table shows solvents and solutions tested in the experiment as liquid agents for surface treatment of the fluoride glass test-pieces. The solvents were ethanol (EA in the table), acetonitrile (AN) and N,N-dimethylformamide (DMF), and the solutions were of fluorine compounds in these three kinds of solvents. In the table the concentration of 1 mol/kg means dissolution of 1 mol of the fluorine compound in 1 kg of the solvent.

Each of the treatment liquids shown in the table was put into a polyethylene bottle, and several test-pieces of the fluoride glass were kept immersed in the treatment liquid at room temperature for a predetermined period of time, viz. for 1 day or for 7 days. After that the treated test-pieces were immediately and well washed with the solvent used in the treatment liquid or another nonaqueous organic solvent which is compatible with the solvent in the treatment liquid, and in an inert gas atmosphere the washed test-pieces were placed in an electric oven. In advance the inert gas was thoroughly desiccated so as to reduce the moisture content to 1 ppm or below.

In the inert gas atmosphere in the electric oven the test-pieces were heated at 325° C. for 2 min. After that the number of crystals appeared on a 6 mm square surface of a test-piece was counted. For comparison, untreated test-pieces of the fluoride glass were subjected to the same heating, and the number of crystals appeared on the surface was counted to judge the crystallization suppressing effect of the tested liquid agent by the ratio of the crystal count on the test-piece treated with the liquid agent to the crystal count on the untreated test-piece. In the table every index number of the count of crystals is on the basis of 1 for the count on the test-piece heated for the same period of time without pretreatment with the liquid. In the table the "XX" mark means that the number of crystals was too large to accurately count.

| No. | Solute | Solvent | Concentration of Solution | Count of Crystals (index number) samples treated for 1 day | samples treated for 7 days |
|---|---|---|---|---|---|
| 1 | — | EA | — | 0.32 | 0.51 |
| 2 | — | AN | — | 1.87 | 4.49 |
| 3 | — | DMF | — | 0.38 | 0.58 |
| 4 |  | EA | 1 mol/kg | 0.20 | 0.04 |
| 5 | $LiPF_6$ | AN | " | 0.25 | 0.99 |
| 6 |  | DMF | " | 0.01 | 0.01 |
| 7 |  | EA | saturated | 0.22 | 0.41 |
| 8 | $KPF_6$ | AN | " | XX | XX |
| 9 |  | DMF | " | XX | XX |
| 10 |  | EA | " | 0.28 | 0.14 |
| 11 | $KBF_4$ | AN | " | 0.91 | 1.24 |
| 12 |  | DMF | " | XX | XX |
| 13 |  | EA | " | 0.43 | 0.39 |
| 14 | $K_2SiF_6$ | AN | " | 2.34 | 1.48 |
| 15 |  | DMF | " | 0.56 | 0.14 |
| 16 |  | EA | " | 0.22 | 0.25 |
| 17 | $K_2TiF_6$ | AN | " | 1.07 | 0.27 |
| 18 |  | DMF | " | 1.27 | 0.28 |
| 19 |  | EA | " | 0.26 | 0.01 |
| 20 | $NaBF_4$ | AN | " | 0.14 | 0.01 |
| 21 |  | DMF | 1 mol/kg | 0.01 | 0.01 |
| 22 |  | EA | saturated | 0.38 | 0.51 |
| 23 | $Na_2SiF_6$ | AN | " | 3.34 | 2.09 |
| 24 |  | DMF | " | 0.62 | 0.51 |
| 25 |  | EA | " | 0.04 | 0.06 |
| 26 | $NH_4F$ | AN | " | 0.65 | 2.80 |
| 27 |  | DMF | " | 0.32 | 0.39 |
| 28 |  | EA | " | 0.12 | 0.29 |
| 29 | $NH_4F.HF$ | AN | " | 0.72 | 0.02 |

-continued

| No. | Solute | Solvent | Concentration of Solution | Count of Crystals (index number) samples treated for 1 day | samples treated for 7 days |
|---|---|---|---|---|---|
| 30 | | DMF | " | 0.01 | 0.16 |
| 31 | | EA | " | 0.28 | 0.20 |
| 32 | $NH_4BF_4$ | AN | " | 0.56 | 0.49 |
| 33 | | DMF | 1 mol/kg | 0.24 | 0.12 |
| 34 | $NaPF_6$ | DMF | 1 mol/kg | 0.28 | 0.03 |
| 35 | $LiBF_4$ | DMF | 1 mol/kg | 0.16 | 0.01 |

The experimental results in the table indicate the necessity of carefully choosing a solvent or a combination of a fluorine compound and a solvent for effective suppression of crystallization of fluoride glass. For example, it is unsuitable to use aceto-nitrile alone, though it is effective to use a solution of $NaBF_4$ or $NH_4BF_4$ in acetonitrile: in the case of a solution of $KPF_6$ ethanol is suitable as the solvent, but both acetonitrile and dimethylformamide are unsuitable.

The table shows the advantage of using a solution of $LiPF_6$, $NaBF_4$ or $LiBF_4$ in dimethylformamide.

What is claimed is:

1. A method for suppressing crystallization of an article made of a glass consisting of metal fluorides, the method comprising the step of treating at least one surface of the glass article with a solution of an inorganic fluorine compound, which is selected from the group consisting of alkali metal compounds containing fluorine and ammonium compounds containing fluorine, in an organic solvent having no water by immersing the glass article in said solution for at least about 3 hr.

2. A method according to claim 1, wherein said fluorine compound is selected from the group consisting of $LiPF_6$, $NaPF_6$, $KPF_6$, $LiBF_4$, $NaBF_4$, $KBF_4$, $K_2SiF_6$, $K_2TiF_6$, $Na_2SiF_6$, $NH_4F$, $NH_4F.HF$ and $NH_4BF_4$.

3. A method according to claim 1, wherein said organic solvent is selected from the group consisting of methanol, ethanl, 1-propanol, 2-chloroethanol, 2-aminoethanol and ethylene glycol.

4. A method according to claim 1, wherein said organic solvent is selected from the group consisting of formamide, N-methylformamide, N,N-dimethylformamide, N-methylpropionamide, acetonitrile and acrylonitrile.

5. A method according to claim 1, wherein said organic solvent is selected from the group consisting of dimethyl ether, diethyl ether, ethylene carbonate, propylene carbonate, dimethoxyethane, ethyl acetate and dimethyl sulfoxide.

6. A method according to claim 1, wherein said organic solvent is ethanol, said fluorine compound being selected from the group consisting of $LiPF_6$, $KPF_6$, $KBF_4$, $K_2SiF_6$, $K_2TiF_6$, $NaBF_4$, $Na_2SiF_6$, $NH_4F$, $NH_4F.HF$ and $NH_4BF_4$.

7. A method according to claim 1, wherein said organic solvent is N,N-dimethylformamide, said fluorine compound being selected from the group consisting of $LiPF_6$, $NaPF_6$, $K_2SiF_6$, $K_2TiF_6$, $LiBF_4$, $NaBF_4$, $Na_2SiF_6$, $NH_4F$, $NH_4F.HF$ and $NH_4BF_4$.

8. A method according to claim 1, wherein said organic solvent is acetonitrile, said fluorine compound being selected from the group consisting of $LiPF_6$, $K_2TiF_6$, $NaBF_4$, $NH_4F$, $NH_4F.HF$ and $NH_4BF_4$.

9. A method according to claim 1, wherein the treatment is made at room temperature.

10. A method according to claim 1, wherein said solution is prepared by dissolving up to 1 mol of said inorganic fluorine compound in 1 kg of said organic solvent.

11. A method according to claim 10, wherein the solubility of said inorganic fluorine compound in said organic solvent is less than 1 mol/kg solvent at room temperature, said solution being a saturated solution.

* * * * *